US006970542B2

(12) United States Patent
Moisey et al.

(10) Patent No.: US 6,970,542 B2
(45) Date of Patent: Nov. 29, 2005

(54) METHODS AND SYSTEMS FOR IDENTIFYING CALLS CONNECTED WITHOUT ANSWER SUPERVISION AND FOR AUTOMATICALLY GENERATING BILLING INFORMATION FOR THE CALLS

(75) Inventors: Kenneth Andrew Moisey, Raleigh, NC (US); Peter Joseph Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 53 days.

(21) Appl. No.: 10/654,499

(22) Filed: Sep. 3, 2003

(65) Prior Publication Data
US 2005/0047569 A1 Mar. 3, 2005

(51) Int. Cl.[7] ............................................. H04M 15/00
(52) U.S. Cl. ............ 379/126; 379/114.04; 379/114.28; 379/121.05
(58) Field of Search ........................ 379/32.01, 32.02, 379/112.01, 112.08, 114.01, 114.04, 114.28, 379/121.05, 124, 126, 127.02, 133, 189, 379/229, 165, 127.03, 350; 370/373, 374, 370/377, 378, 384; 705/34

(56) References Cited

U.S. PATENT DOCUMENTS

| 4,748,653 A | 5/1988 | Kerr |
| 4,760,594 A | 7/1988 | Reed |
| 4,811,378 A | 3/1989 | Else et al. |
| 5,134,651 A | 7/1992 | Ortiz et al. |
| 5,218,632 A | 6/1993 | Cool |
| 5,265,157 A | 11/1993 | Jolissaint et al. |
| 5,361,297 A | 11/1994 | Ortiz et al. |
| 5,408,524 A * | 4/1995 | Reum ......................... 379/157 |
| 5,509,055 A * | 4/1996 | Ehrlich et al. .............. 379/133 |
| 5,926,533 A | 7/1999 | Gainsboro |
| 5,949,864 A * | 9/1999 | Cox ........................... 379/189 |
| 6,111,946 A * | 8/2000 | O'Brien ...................... 379/230 |
| 6,256,379 B1 | 7/2001 | Gillespie |
| 6,327,350 B1 * | 12/2001 | Spangler et al. ....... 379/115.01 |
| 6,385,301 B1 * | 5/2002 | Nolting et al. ........... 379/32.01 |
| 6,826,198 B2 * | 11/2004 | Turina et al. ............... 370/467 |

FOREIGN PATENT DOCUMENTS

EP     0 487 197 A2    5/1992

* cited by examiner

*Primary Examiner*—Quoc Tran
(74) *Attorney, Agent, or Firm*—Jenkins, Wilson & Taylor, P.A.

(57) ABSTRACT

Methods and systems for identifying calls connected without answer supervision and for automatically generating billing information for these calls are disclosed. A monitoring device copies signaling messages associated with calls. The signaling messages are correlated into call detail records. The call detail records are analyzed to identify calls connected without answer supervision. In one implementation, calls that exceed a predetermined duration and for which no answer message was returned from the terminating end office are identified as calls without answer supervision. For these calls, billing records may be generated and forwarded to a network billing center.

30 Claims, 7 Drawing Sheets

METHODS AND SYSTEMS FOR IDENTIFYING CALLS CONNECTED WITHOUT ANSWER SUPERVISION AND FOR AUTOMATICALLY GENERATING BILLING INFORMATION FOR THE CALLS

TECHNICAL FIELD

The present invention includes methods and systems for generating billing information in a telecommunications network. More particularly, the present invention relates to methods and systems for identifying calls connected without answer supervision and for automatically generating billing information for the calls.

BACKGROUND ART

In modern telecommunications networks, an out-of-band common channel signaling (CCS) network is employed to facilitate the setup and tear down of voice and/or data communication sessions between telephone service subscribers. In the United States, this signaling network is referred to as the signaling system 7 (SS7) network. The SS7 network utilizes the ISDN user part (ISUP) protocol to set up and tear down calls. ISUP messages used to set up calls include an initial address message (IAM), an address complete message (ACM), and an answer message (ANM). FIG. 1 illustrates an exemplary ISUP call setup message flow. Referring to FIG. 1, a telecommunications network 100 includes a calling party 110, an originating end office 112, a first signal transfer point (STP) 114, a second STP 116, a terminating end office 118, and a called party 120. A voice grade bearer path 122 and an SS7 signaling path 124 are also utilized to facilitate the establishment of a call.

In FIG. 1, calling party 110 goes off-hook and dials the telephone number associated with called party 120. Originating end office 112 serving calling party 110 formulates an ISUP IAM message, which is transmitted via STPs 114 and 116 to terminating end office 118. Terminating end office 118 serving called party 120 receives the IAM message and responds to originating end office 112 with an ACM message. The ACM message serves as both an acknowledgement of the IAM and an indicator that a ring tone is being sent to the called party. When the called party goes off-hook to answer the call, the terminating end office 118 formulates an ANM message, which is routed back to originating end office 112.

When either party goes on-hook, that party's end office sends a release (REL) message to the other end office. In FIG. 1, it is assumed that calling party 110 goes on-hook. Accordingly, end office 112 sends a release message to end office 118. When end office 118 receives the release message, end office 118 formulates a release complete (RLC) and sends the RLC message to end office 112.

In telecommunications networks, the ANM message notifies the originating end office that the called party has answered the call and that billing for the call should be commenced. However, in some situations, an ANM message may not be returned by the terminating facility serving the called party, but the call may nonetheless be completed without the ANM message. The failure to return an ANM message during setup of a call is commonly referred to as "no answer supervision" and may be unintentional or deliberate, in order to avoid being billed for the call. For example the owner of a private branch exchange (PBX) may configure the switch in a manner such that an ANM message is not returned during the call setup signaling process in an attempt to avoid being billed for calls. Interactive voice response (IVR) systems that are widely deployed in telecommunication networks are also common sources of no answer supervision problems. Revenue losses due to no answer supervision scenarios have been and continue to be substantial for network operators.

U.S. Pat. No. 4,811,378 to Else et al. describes a technique where switches in the telephone network can be upgraded such that an open voice channel is provided only after an ANM message has been received. U.S. Pat. No. 5,265,157 to Jolissaint et al. proposes a solution to the no answer supervision problem that utilizes tonal signaling (e.g., DTMF tones) technology to ensure answer supervision. U.S. Pat. No. 6,111,946 to O'Brien discloses a method and system for providing answer supervision that involves the deployment of a special node in a telecommunications network that detects a lack of answer supervision during an in-progress call. In response to detecting a lack of answer supervision related to the call, the special node returns an ANM message to the originating end office facility on behalf of the terminating end office, PBX facility, or IVR facility. The originating end office facility may use the injected ANM message to trigger the creation of a billing record.

While the above-described solutions partially address the no answer supervision problem, each of these solutions has its disadvantages. For example, the solutions requiring end office upgrades are time and cost-intensive to implement due to the number of end offices in a service provider's network. Solutions involving in-band or DTMF signaling require specialized equipment for monitoring voice trunks and for generating in-band signaling. Finally, the solutions that involve injection of an answer message in the network require specialized trunk monitoring equipment and also create unnecessary signaling traffic in the network. Accordingly, there exists a need for improved methods and systems for identifying calls connected without answer supervision and for generating billing information for the calls.

DISCLOSURE OF INVENTION

A NAS detection and billing system of the present invention addresses an industry-wide billing problem by analyzing signaling messages to detect calls connected without answer supervision. As used herein, the term "connected call" refers to a condition of the media trunk between the called and calling party in which bi-directional media stream communications between the called and calling party are possible. Such a condition may occur when the called party goes off-hook, regardless of whether the called party end office sends an ANM message to the calling party end office.

The NAS detection and billing system of the present invention may detect calls connected without answer supervision and may automatically generate a billing record based on the call. As used herein, an automatically generated billing record refers to a billing record triggered based on the signaling messages or copies of the signaling messages actually used to set up and/or tear down the call. An automatically generated billing record does not require the injection of an artificial ANM message into the call flow sequence in order to trigger billing record generation. As a result, the NAS detection and billing system of the present invention reduces the need for specialized real time signaling message injection hardware and software.

In one exemplary implementation, the NAS detection and billing system of the present invention may generate billing records, such as BAF records, vendor specific records, CDMA records, CIBER/TAP records, IPDR records, etc., for calls connected without answer supervision. The billing record may be communicated to a network billing center (e.g., a regional accounting office, an AMA teleprocessing system, etc.) where the record may be used to augment billing information generated by end office switching facilities. For end offices that do not create billing records for calls without answer supervision, the billing record created by the present invention may be the only data used to create bills. Thus, the present invention provides a method for generating bills when switch-based billing fails or is incomplete.

A billing record generated by a NAS detection and billing system of the present invention may include information that identifies the billing record as having been generated in response to a call connected with no answer supervision. This information may be used by the billing center to manually or automatically generate bills for calls connected without answer supervision. In addition, the information may be used to locate end offices that fail to provide answer supervision and take appropriate corrective action.

A NAS detection and billing system of the present invention may be implemented using a stand-alone network monitoring platform. Alternatively, the system may be integrated within a signaling system 7 (SS7) routing node, such as a signal transfer point (STP) or Internet protocol (IP) capable signaling gateway (SG). In yet another implementation, the NAS detection and billing system may include both internal and external signaling link probes for collecting call signaling messages.

Accordingly, it is an object of the present invention to provide methods and systems for creating accurate billing record information when a call is connected but no answer supervision is returned to the originating switch.

It is another object of the invention to provide a network operator with billing information associated with a no answer supervision call where it is possible for the network operator to identify the billing information as having been generated in response to a no answer supervision call.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Figure 1:
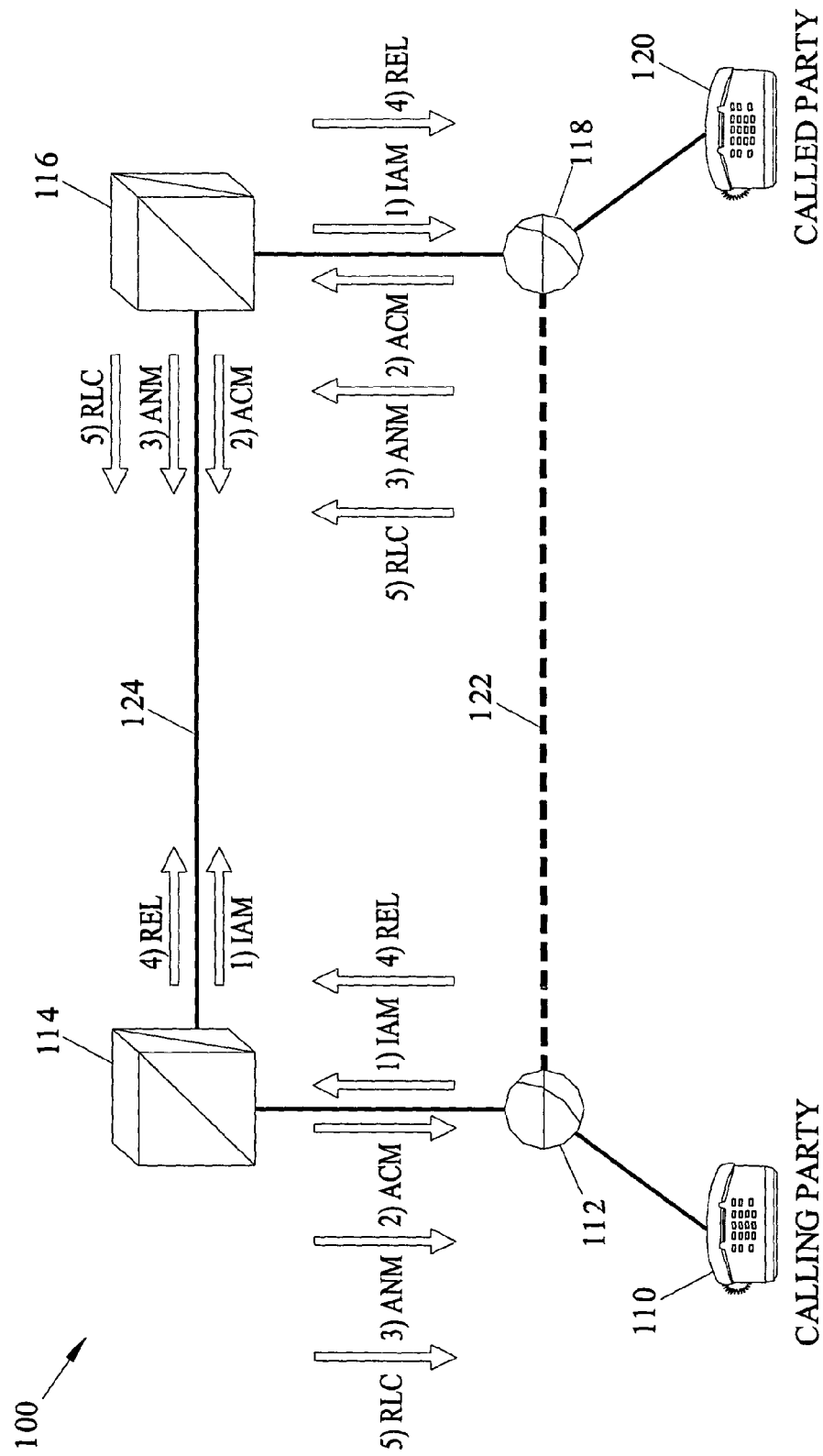
FIG. 1 is a network diagram illustrating SS7 call setup and tear down signaling messages.
Figure 2:
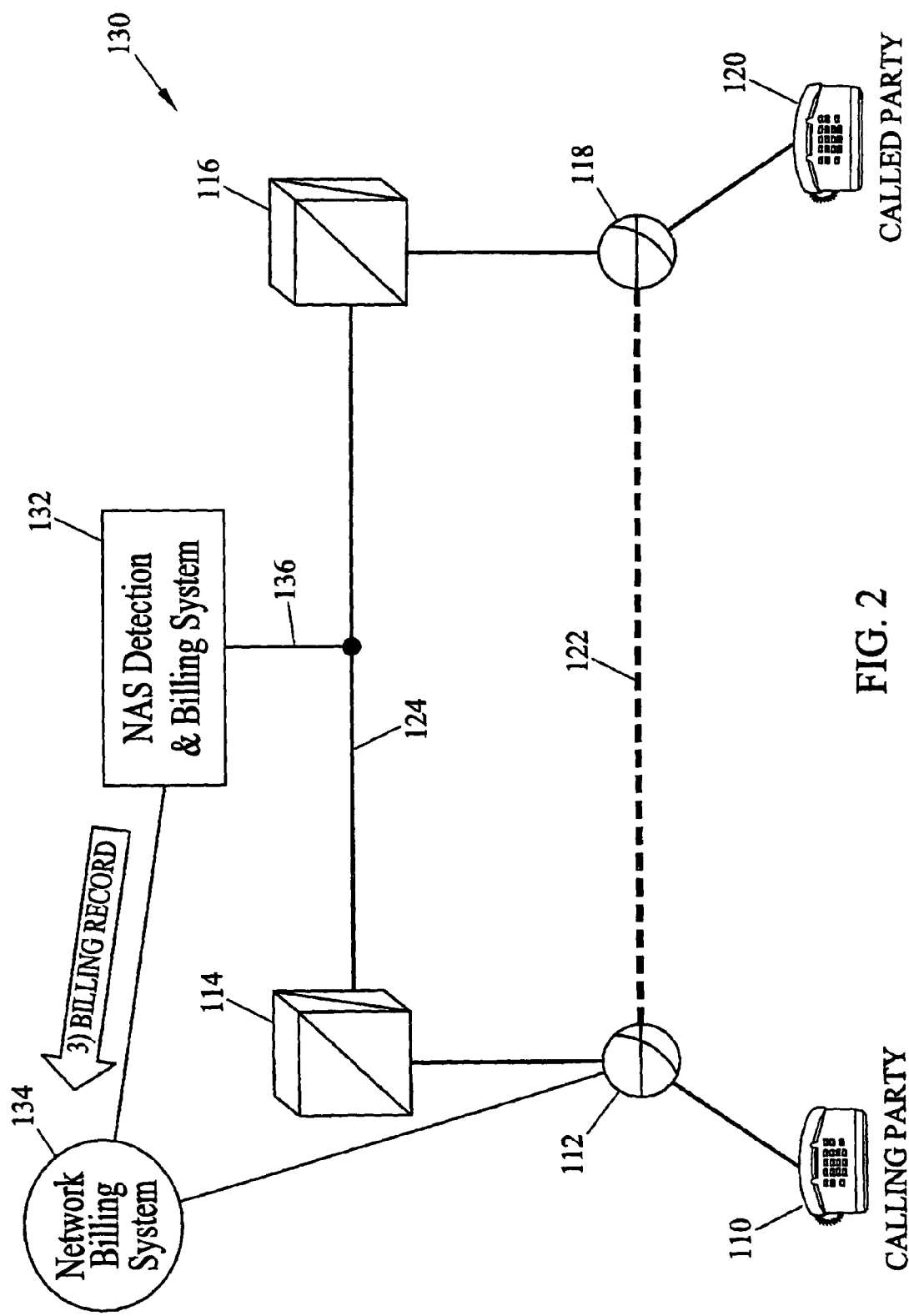
FIG. 2 is a network diagram illustrating a no answer supervision detection and billing system that uses external signaling link probes according to an embodiment of the present invention.

According to one aspect of the invention, a NAS detection and billing system may be configured to identify connected calls for which answer supervision has not occurred and to automatically generate bills for these calls. FIG. 2 illustrates a telecommunications network 130 including NAS detection and billing system 132 according to an embodiment of the present invention. In FIG. 2, network 130 includes a calling party 110, an originating end office 112, a first STP 114, a second STP 116, a terminating end office 118, a called party 120, and a network billing center 134. Network 130 also includes signaling links 124 and trunks 122 to transport signaling and media communications, respectively.

In the illustrated example, NAS detection and billing system 132 may utilize one or more external signaling system 7 (SS7) link monitoring probes 136 to monitor SS7 signaling messages traversing signaling link 124. External signaling probes 136 may include any suitable probes for passively monitoring signaling message transported over SS7 signaling links. Such probes may include link interface cards for passively copying the signaling messages and link interface modules for executing network monitoring applications. Exemplary external signaling link probes suitable for use with embodiments of the present invention include the i-2000 and i-3000 shelves available from Tekelec of Calabasas, Calif.

As indicated in FIG. 2, calling party 110 is connected to originating end office (EO) facility 112, which provides access to voice path 122 and which also initiates and executes the call setup signaling (e.g., SS7 signaling) necessary to establish a voice connection via bearer path 122. Originating EO 112 is also responsible for generating billing information associated with calls originated by calling party 110. EO 112 may formulate and convey message accounting records, such as BAF records, to network billing center 134. The BAF records may be communicated to billing center 134 using the AMA teleprocessing system X.25 (AMATPS—X.25) protocol, the AMA data networking system file transfer protocol (AMADNS—FTP) protocol, or other protocol implemented by billing center 134. As described above, certain subscriber-related billing records are generated by an originating EO facility in response to the receipt of an ISDN user part (ISUP) ANM message. The billing problem addressed by the present invention involves call scenarios wherein an ANM message is not returned by a terminating EO facility or other terminating node in a network during the course of a connected call, and, consequently, an ANM message is never received by the originating EO facility.

Called party 120 is connected to terminating end office facility 118, which provides access to voice path 122 and which also performs the call setup signaling necessary to establish a voice connection to calling party 110 via bearer path 122. Terminating EO facility 118 is supposed to return an ISUP ANM message to originating EO 112 once called party 120 goes off-hook and answers the call. However, in this example, it is assumed that end office 118 fails to return an ANM message even after the call is completed to called party 120.

NAS detection and billing system 132 may monitor the exchange of call setup signaling messages between originating end office 112 and terminating end office 118 in order to detect the lack of answer supervision. In FIG. 2, NAS detection and billing system 132 monitors call signaling messages associated with a call between calling and called parties 110 and 120, respectively, and produces a call detail record (CDR). A CDR created by NAS detection and billing system 132 may include some or all of the ISUP call signaling messages associated with the setup and tear down of a telephone call. Examples of ISUP signaling messages that may be included in the CDR include IAM messages, ACM messages, suspend (SUS) messages, resume (RES), REL messages, and RLC messages. NAS detection and billing system 132 may collect information from these messages and store the information in a CDR. The CDR may include the types of messages received, OPCs, DPCs, called and calling party addresses, timestamps, or any other information that may be of interest for billing purposes.

Figure 3:
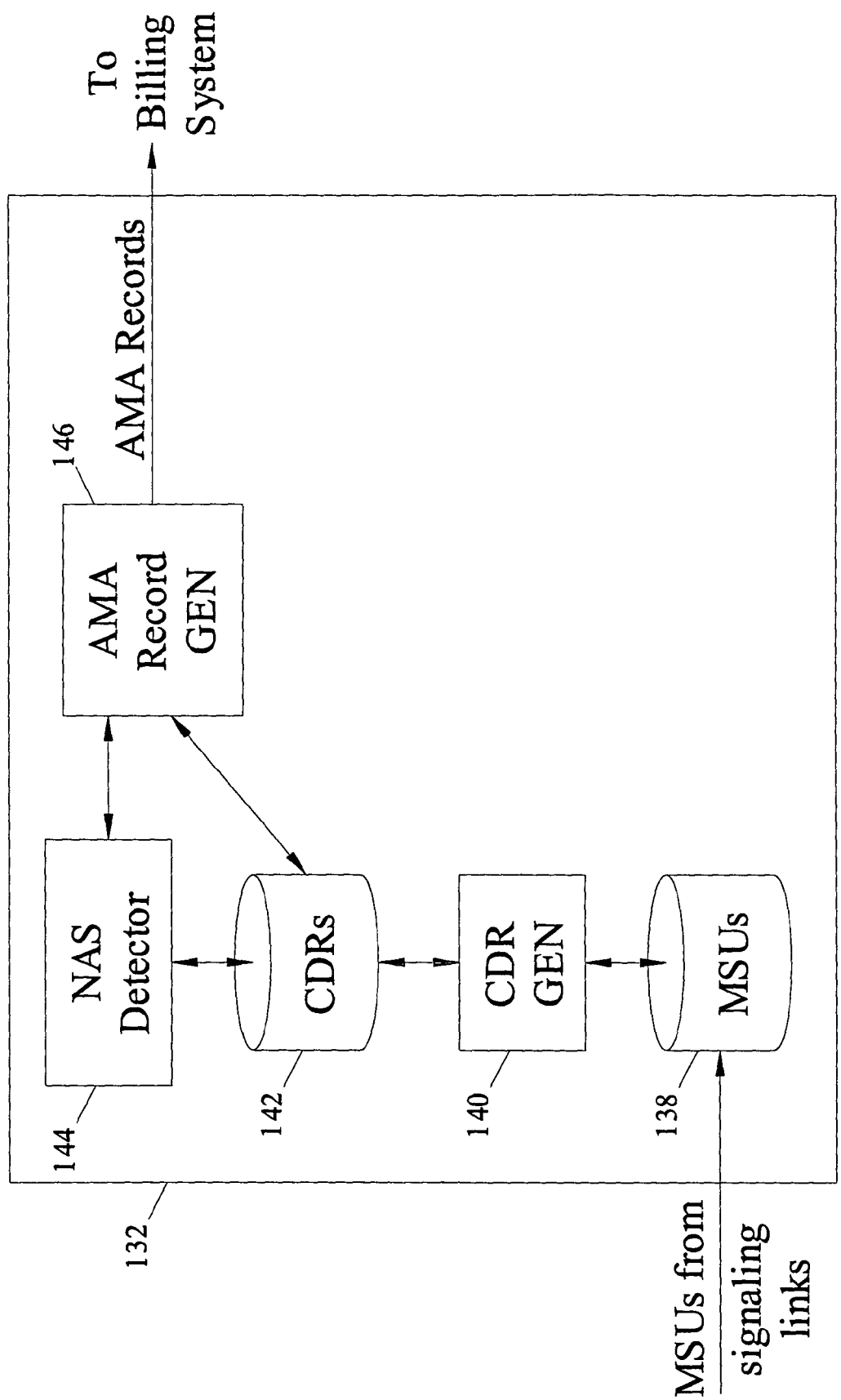
FIG. 3 is a block diagram of an exemplary architecture for a NAS detection and billing system according to an embodiment of the present invention.

FIG. 3 illustrates an exemplary internal structure of NAS detection and billing system 132. In FIG. 3, NAS detection and billing system 132 includes an MSU database 138, a CDR generator 140, a CDR database 142, a NAS detector 144, and an AMA record generator 146. Each of these components may be implemented in hardware, software, firmware, or any combination thereof. It is understood that NAS detection and billing system 132 may be implemented on a general purpose computing platform including a microprocessor and memory for implementing the functions illustrated in FIG. 3.

In operation, NAS detection and billing system 132 receives MSUs copied from SS7 signaling links and stores the MSUs in MSU database 138. CDR generator 140 correlates the MSUs stored in database 138 relating to the same call or transaction to create call detail records. For example, CDR generator 140 may correlate MSUs based on OPC, DPC, and CIC to create ISUP CDR. The call detail records may be stored in CDR database 142. NAS detector 144 analyzes the CDRs in database in 142 and identifies CDRs associated with calls for which an answer message was not returned. For these calls, NAS detector 144 applies criteria to determine which calls should be billed. Exemplary criteria for identifying billable calls will be described in detail below. For the calls for which billing should be performed, NAS detector 144 forwards the information to AMA record generator 146. AMA record generator 146 generates AMA-formatted records, such as BAF records, and forwards the BAF records to network billing system 134.

Figure 4:
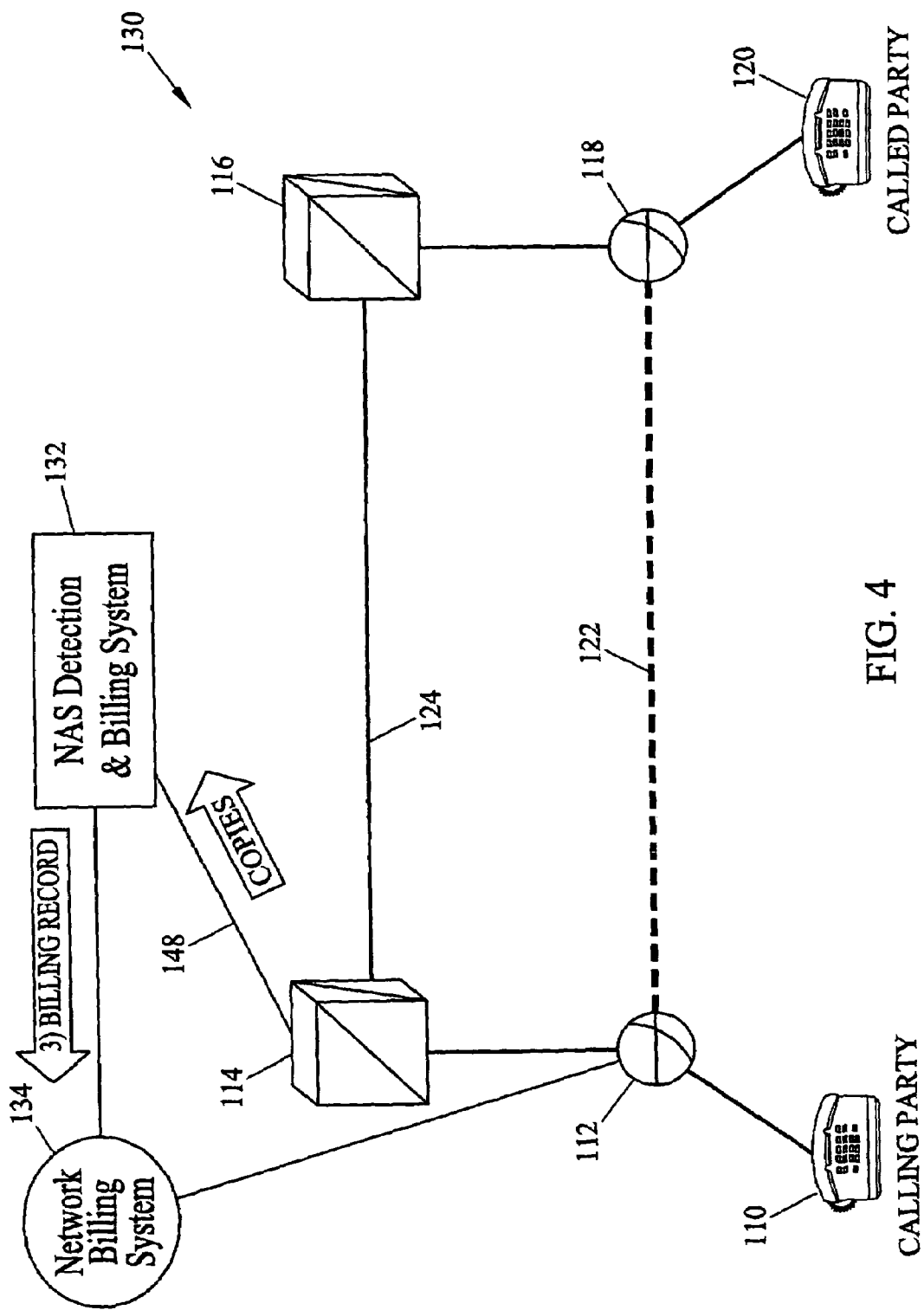
FIG. 4 is a network diagram illustrating a NAS detection and billing system that uses signaling message copy functions internal to a signaling message routing node according to an embodiment of the present invention.

FIG. 4 illustrates an alternate configuration of NAS detection and billing system 132. In FIG. 4, NAS detection and billing system 132 monitors SS7 signaling message traffic on one or more signaling links using a probeless interface integrated with a routing node, such as STP 114. STP 114 may include internal message copy functions for copying some or all MSUs received by STP 114 and forward the MSUs to NAS detection and billing system 132 via connection 148. The internal MSU copy functions may be implemented in hardware, software, firmware, or combination thereof. One example of a commercial available system that includes MSU copy functions internal to an STP is the Sentinel data collection system available from Tekelec of Calabasas, Calif. An exemplary internal architecture for an internal MSU copy function will be described in detail below with regard to FIG. 5.

In FIGS. 2 and 4, a single STP 114 serves originating EO 112, and a single signaling link 124 connects STPs 114 and 116. However, it is understood that SS7 network routing nodes, such as STPs, are deployed in mated pairs, which terminate multiple signaling links. As such, the monitoring and/or CDR generating component of a NAS detection and billing system of the present invention may simultaneously monitor and correlate signaling message traffic across multiple signaling links that connect to multiple routing nodes without departing from the scope of the invention.

Figure 5:
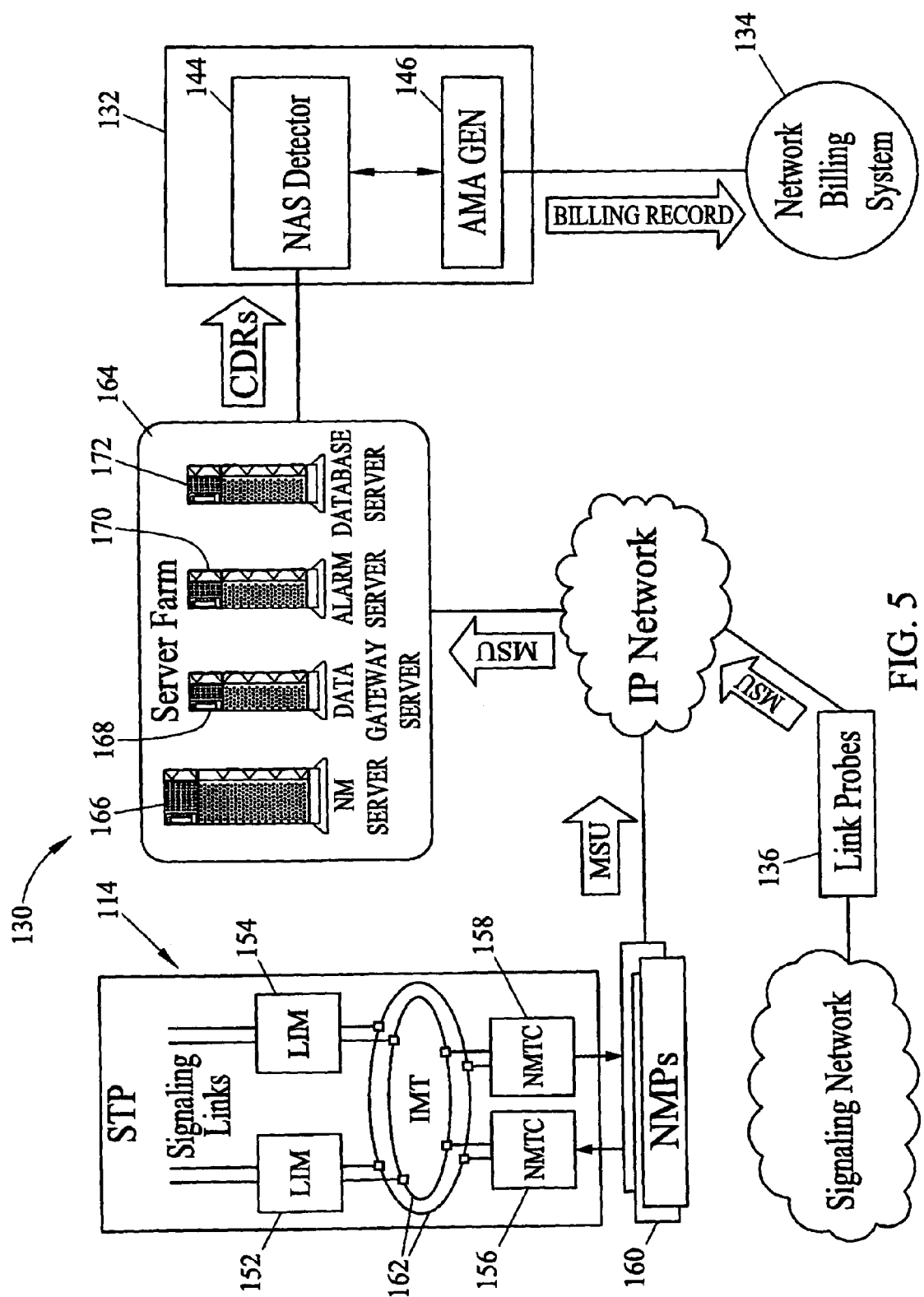
FIG. 5 is a block diagram illustrating an exemplary internal architecture for a NAS detection and billing system that uses both internal and external signaling link probes according to an embodiment of the present invention.

FIG. 5 illustrates an exemplary NAS detection and billing system that includes a combination of internal and external monitoring probes. In FIG. 5, only a portion of network 130 is shown. The illustrated portion of signaling network 130 includes STP 114 and billing system 134. STP 114 includes a plurality of internal processing modules, including modules for performing network monitoring functions. In the illustrated example, STP 114 includes link interface modules 152 and 154 and network monitoring transport cards 156 and 158. Link interface modules 152 and 154 send and receive SS7 messages via SS7 signaling links. Network monitoring transport cards 156 and 158 communicate copies of signaling messages from link interface modules 152 and 154 to network monitoring processor 160. Modules 152, 154, 156, and 158 in STP 114 are connected via a buses 162.

Network monitoring processors 160 include server software that responds to service requests from LIMs 152 and 154. The server software on each network monitoring processor 160 may be associated with a predetermined set of signaling links. For example, one network monitoring processor may be configured to monitor messages copied from signaling link 0–31 and another network monitoring processor may be configured to monitor signaling links 32–64 in a signal transfer point equipped with 64 nodes.

When MSUs arrive at LIMs 152 and 154, LIMs 152 and 154 each broadcast a service request to network monitoring processors 160. The network monitoring processor that is provisioned to handle requests for a particular LIM responds to the request. If the response is a service acceptance, the requesting LIM establishes a TCP/IP connection with the responding network monitoring processor 160 and begin sending copies of signaling messages to the network monitoring processor. The network monitoring processor receives the messages and stores the messages in a database.

In FIG. 5, a server farm 164 includes a plurality of servers for processing messages and alarms received from network monitoring processors 160 and link probes 136. In the illustrated example, server farm 164 includes a network monitoring server 166, a data gateway server 168, an alarm server 170, and a database server 172. Network monitoring server 166 performs real time signaling links status reporting, real time signaling link protocol analysis, CDR generation, and real time event reporting. Data gateway server 168 receives MSU fragments, formats the fragments into CDR, and sends the CDRs to applications, such as NAS detection and billing system 132. Alarm server 170 collects event message reports and other events that report signaling errors and displays alarms to the network operator. Database server 172 stores data collected by network monitoring server 166 in a database.

In the illustrated example, NAS detection and billing system 132 includes NAS detector 144 and AMA generator 146. NAS detector 144 detects no answer supervision calls and AMA generator 146 generates AMA formatted records, such as BAF records. CDR generation is performed external to NAS detection and billing system 132. In the illustrated example, it is assumed that CDRs are generated by network monitoring server 166 of server farm 164.

NAS PROCESSING

As discussed above, NAS detection and billing system 132 identifies calls connected without answer supervision and automatically generates bills for these calls. In order to perform these functions, a NAS detection and billing system 132 may examine some or all of the SS7 signaling messages associated with a call, and in some cases, the times at which these messages were generated and transmitted through the telephone network. In response to detecting that a call has been completed without answer supervision, NAS detection and billing system 132 may generate a billing record, such as an AMA BAF record, and communicate this record directly to the appropriate regional accounting office (RAO), or network billing center, via the AMATPS or AMADNS protocols. An indicator may be included in the billing record that notifies a network billing center that the billing record has been generated by a NAS system.

Figure 6:
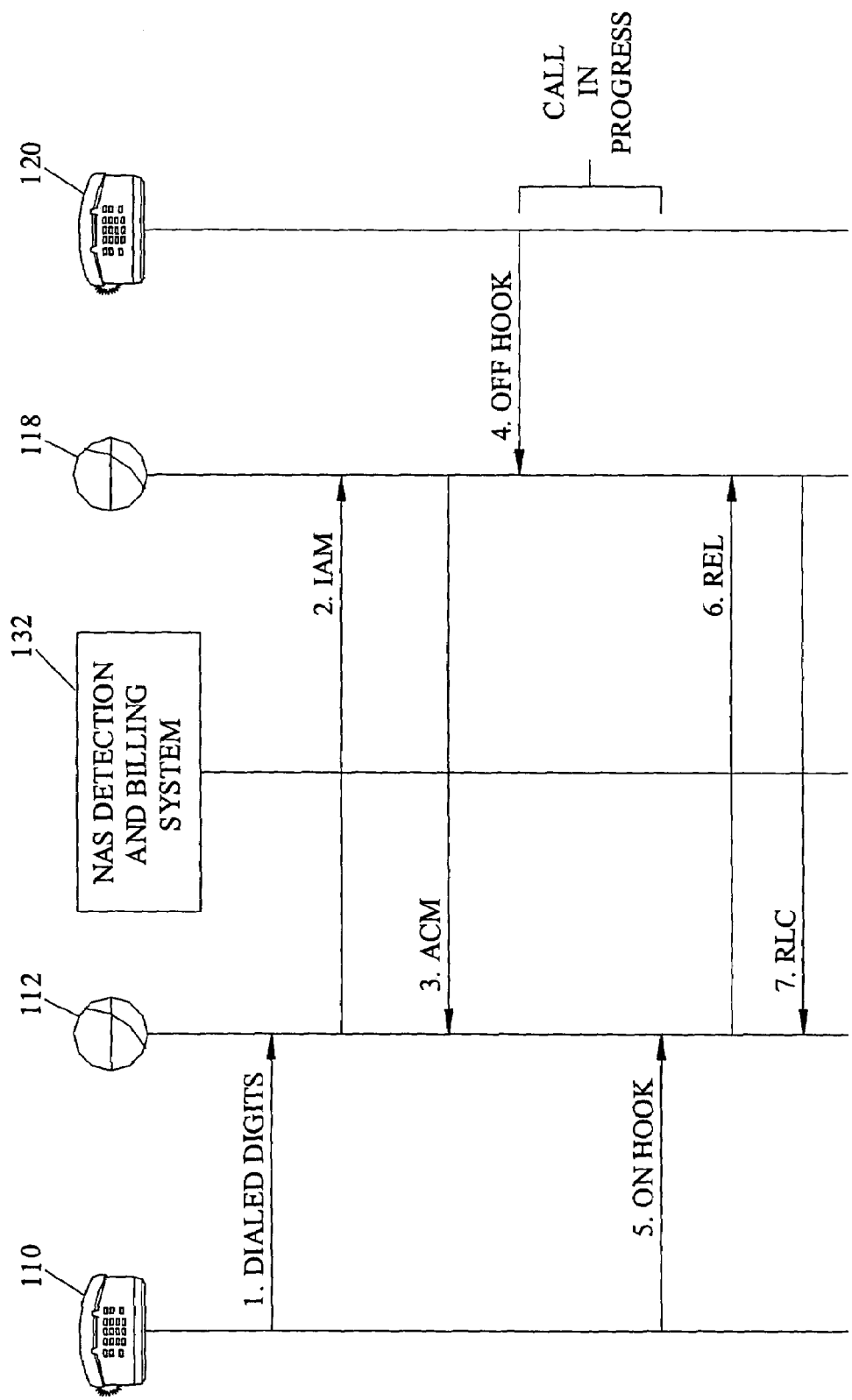
FIG. 6 is a signaling message flow diagram for a call completed without answer supervision.

FIG. 6 is a call flow diagram illustrating exemplary signaling messages that may be exchanged between a calling and called party end office for a call that is completed without supervision. Referring to FIG. 6, in line 1 of the call flow diagram, calling party 110 dials the telephone number associated with called party 120, and the dialed digits are communicated to end office 112. In line 2 of the call flow diagram, end office 112 formulates an initial address message and forwards the initial address message to called party end office 118. In response to the initial address message, called party end office 118 generates an address complete message and sends the address complete message to calling party end office 112. The address complete message acknowledges the IAM message and indicates that a ring tone is being sent to called party 120.

In line 4 of the call flow diagram, called party 120 goes off-hook. Once called party 120 goes off-hook, the call is in progress. Under normal operating conditions, called party end office 118 would return an answer message indicating that the called party had answered the call. However, in this example, it is assumed that the answer message is not generated but that the call is connected. This phenomenon occurs because the answer message is not a condition to allowing communications to proceed over the voice trunk. However, as discussed above, because the answer message is not generated, billing is not triggered at either of the end offices.

In line 5 of the call flow diagram, calling party 110 goes on-hook. In line 6 of the call flow diagram, end office 112 generates a release message to release resources associated with the call and sends the release message to called party end office 118. In line 7 of the call flow diagram, called party end office 118 generates a release complete message and forwards the release complete message to end office 112.

Thus, without the present invention, a call would be in progress from the time that calling party 120 goes off-hook until the time that either party goes on-hook and no billing information would be generated for this call. However, NAS detection and billing system 132 preferably creates a CDR including the IAM, ACM, REL, and RLC messages and analyzes the CDR to detect the fact that the call was completed without answer supervision and to generate billing information based on the information included in the CDR. For example, the billing information may include the time between receipt of the IAM or ACM messages and the REL or RLC messages. Thus, by analyzing SS7 data associated with a call, NAS detection and billing system 132 is capable of detecting calls for which there is no answer supervision.

In addition to generating SS7-based CDRs, NAS detection and billing system 132 may generate no answer supervision CDRs based on IP-encapsulated SS7 messages. In telecommunications networks, SS7 signaling messages may be encapsulated in Internet protocol (IP) packets using an adaptation layer and a transport layer. For example, SS7 signaling messages may be encapsulated in M2PA, M2UA, or M3UA protocol data units, which may in turn be encapsulated in TCP/IP or SCTP/IP protocol data units. In order to create CDRs based on such messages, NAS detection and billing system 132 may extract the ISUP messages carried in the payload portion of the adaptation layer protocol data units and creates CDRs based on the ISUP messages. NAS detection and billing system 132 may then analyze the CDRs to determine whether the CDRs indicate calls connected without supervision and automatically generate billing information for such calls.

Figure 7:
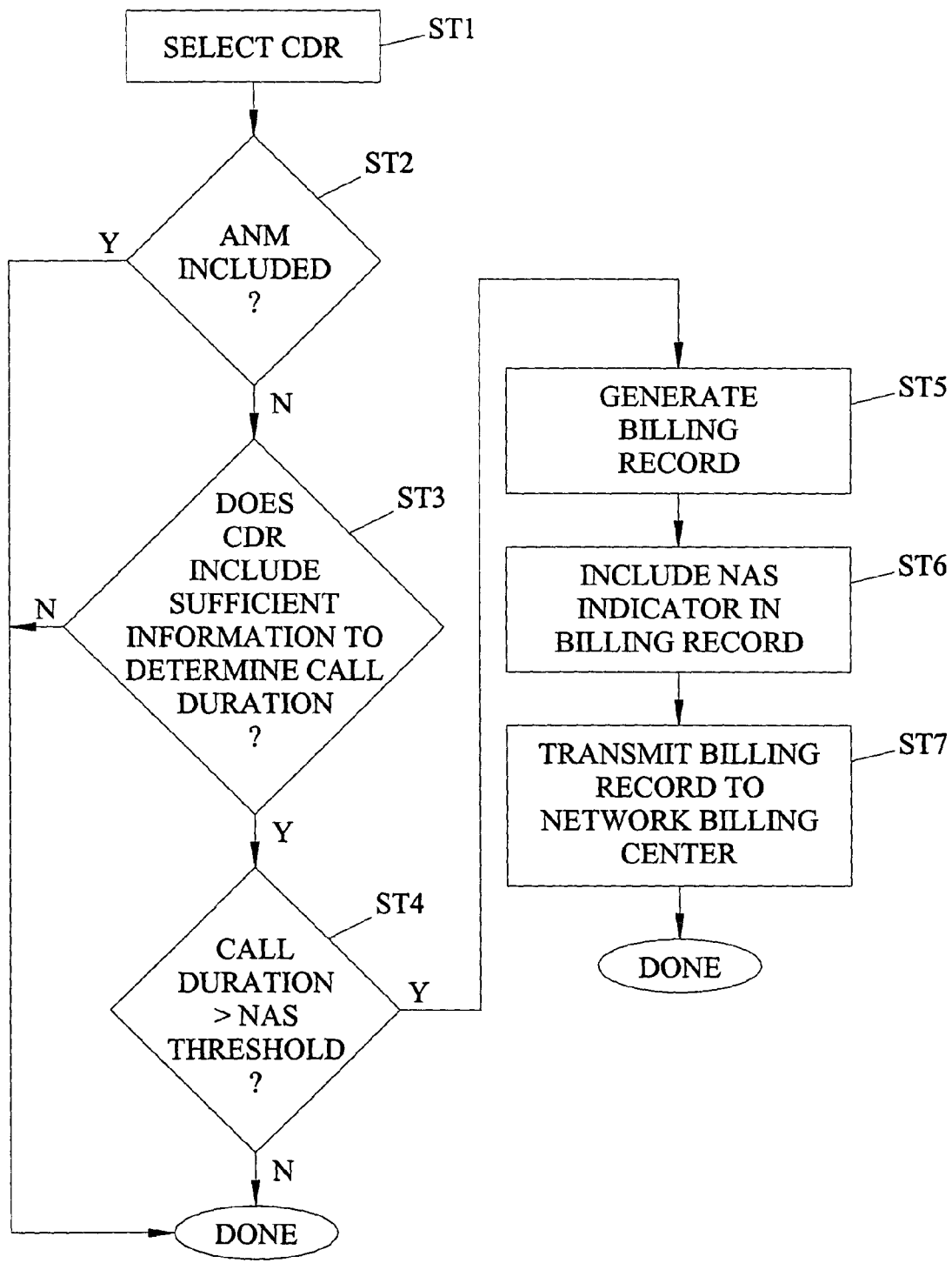
FIG. 7 is a flow chart illustrating exemplary steps performed by a NAS detection and billing system in detecting calls without supervision and automatically generating bills based on the calls according to an embodiment of the present invention.

FIG. 7 illustrates exemplary processing that may be performed by NAS detection and billing system 132 in identifying calls connected without answer supervision and automatically generating billing information for such calls. Referring to FIG. 7, in step ST1, CDR information is selected by NAS detector 144 for analysis. The CDR information is examined to determine whether an ISUP ANM message was transmitted from the terminating EO facility 118 to the originating EO facility 112, as indicated in step ST2. If it is determined that an ANM message was communicated, then no further NAS processing is required. However, if it is determined that an ANM message was not communicated, then the CDR information is examined to determine whether the CDR contains sufficient information to determine the call duration (step ST3). For non-real-time NAS detection, this step may include determining whether the CDR includes at least one message associated with creation of the call and at least one message associated with the termination of the call so that the time difference between the origination and termination can be determined. For real-time NAS detection, determining whether the CDR contains sufficient information to identify a call duration may include determining whether the CDR includes an initial message so that the call duration can be determined by subtracting the timestamp of the initial message from the time when NAS detection is performed.

If it is determined that sufficient information is present to determine a call duration, then a further check is performed (ST4) to determine the call duration. In one example, the time between the sending of an IAM message and the generation of a release or disconnect message is determined and used as a measure of call (or call attempt) duration. In another example, the time between the sending of an address complete message and the generation of a release or disconnect message may also be used as a measure of call (or call attempt) duration. For real-time NAS detection, this step may include determining whether the CDR includes an IAM message and subtracting the current time from the time of receipt of the IAM message.

If the call or call attempt duration is determined to be less than a NAS threshold timer value, then no further NAS processing is required for this CDR. The processing steps illustrated in FIG. 7 may then be repeated for the next CDR in the database. It is understood that for real time NAS detection, the same CDR may be rechecked to determine whether the NAS threshold time has been exceeded.

The value of the NAS threshold timer may be selected by a network operator based on call statistics collected in the network over a period of time. Exemplary NAS threshold timer values may range from seconds to minutes. The threshold is preferably set to be sufficiently large as to exclude the maximum time that the calling party can wait for the called party to answer before the call attempt is terminated by the network operator. Since this time period depends on the network operator, the NAS billable call threshold is preferably customizable by the network operator. The goal of setting the threshold is to select a value that identifies calls that are actually connected and that excludes unconnected calls. Appropriate values for the threshold can be determined based on statistics collected by each network operator.

If the call or call attempt duration is determined to be greater than or equal to the NAS threshold timer value, the call is identified as billable, and a billing record is generated, as indicated in step ST5. The billing record may be an AMA-formatted BAF record, which may include an indicator or parameter that identifies the billing record as having been generated by the NAS system in response to a suspected NAS call scenario (ST6). In one embodiment, the identity of the NAS system and the indication that the record is for the NAS condition is conveyed to the Recording Office using the Sensor Type and Sensor identification fields of a BAF record. Within the BAF structure, sensor refers to a system or device that generates the usage measurement data to be formatted into BAF records. Alternatively, or in conjunction with the Sensor Type and Sensor Identification fields, the NAS system would use what is known as the Call Type field of a BAF record to distinguish NAS calls from other records that the system may produce.

The format of BAF records is defined in the Telcordia publication, *Billing Automatic Message Accounting Format (BAF) Generic Requirements, GR*-1100-*CORE,* 2002/12/01, the disclosure of which is incorporated herein by reference in its entirety. The billing record may also include the estimated duration for the call. The estimated duration may be based on the difference in timestamps of the IAM or ANM and REL or RLC messages. The billing record is transmitted either by the AMATPS or AMADNS protocols to the RAO, or other network billing center (ST7), where the billing record may be included with other billing records that have been generated by originating EO 112. The billing record may be examined by a network operator prior to generation of a customer's bill. Alternatively, bills for NAS calls may be generated automatically without further operator supervision.

NAS detection and billing system 132 may operate in a non-real-time fashion based on CDRs stored in a database after calls are completed or in a real-time fashion as CDRs are being generated in real time. For example, the CDRs in CDR database 142 may be generated and stored as calls are completed. NAS detector 144 may analyze the CDRs in the database continuously, as the CDRs are being created in a real-time processing mode. In an alternate mode of operation, NAS detector 144 may periodically access database 142 to analyze CDRs for previously completed calls. Either mode of operation is intended to be within the scope of the invention.

Thus, NAS detection and billing system 132 detects no answer supervision calls and automatically generates bills without requiring voice trunk monitoring equipment, call blocking systems, or the insertion of additional ISUP signaling messages into the network. NAS detection and billing system 132 monitors signaling traffic associated with a call and, from that signaling information, determines whether a no answer supervision call scenario has occurred. In response to identifying call connected without answer supervision, NAS billing system 132 may generate a billing record and forward the billing record to a network billing center.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for identifying calls connected without answer supervision and for automatically generating billing information for such calls, the method comprising:
    (a) examining signaling messages used to establish a call;
    (b) determining whether the call was connected without answer supervision based on the signaling messages;
    (c) in response to determining that the call was connected without answer supervision, automatically generating billing information for the call, wherein automatically generating billing information includes automatically triggering generation of the billing information without requiring injection of an artificial answer message into a signaling message sequence associated with the call; and
    (d) forwarding the billing information to a network billing center.

2. The method of claim 1 wherein examining signaling messages includes examining signaling system 7 (SS7) signaling messages.

3. The method of claim 1 wherein examining signaling messages includes examining Internet Engineering Task Force (IETF) SIGTRAN signaling messages.

4. The method of claim 1 wherein examining signaling messages includes examining a call detail record (CDR).

5. The method of claim 1 wherein determining whether the call was connected without answer supervision includes determining whether an answer (ANM) message has been received for the call.

6. The method of claim 5 wherein determining whether the call was connected without answer supervision comprises, in response to determining that the ANM message has not been received for the call, determining a call duration and whether the call duration exceeds a threshold value.

7. The method of claim 6 wherein determining a call duration includes determining the time difference between a first message associated with the call and a second message associated with the call.

8. The method of claim 6 wherein determining a call duration includes determining the time difference between a first message associated with the call and a current time value.

9. The method of claim 6 wherein determining whether the call was connected without answer supervision includes determining that the call was connected without answer supervision in response to the call duration exceeding the threshold.

10. The method of claim 6 wherein the threshold value is set based on an average time period for a ring, no answer condition in a network.

11. The method of claim 1 wherein steps (a)–(d) are performed in real time as cells are being connected.

12. The method of claim 1 wherein steps (a)–(d) are performed in a non-real-time manner based on signaling messages stored in a database.

13. The method of claim 1 wherein generating billing information includes inserting call duration information in the billing information.

14. A method for identifying calls connected without answer supervision and for automatically generating billing information for such calls, the method comprising:
- (a) examining signaling messages used to establish a call;
- (b) determining whether the call was connected without answer supervision based on the signaling messages;
- (c) in response to determining that the call was connected without answer supervision, automatically generating billing information for the call; and
- (d) forwarding the billing information to a network billing center, wherein generating billing information includes inserting an indicator in the billing information for identifying the call as being connected without answer supervision.

15. A system for identifying calls connected without answer supervision and for automatically generating billing information for such calls, the system comprising:
- (a) a monitoring device for monitoring and copying signaling messages used to establish a plurality of different calls or transactions;
- (b) a NAS detection function operatively associated with the monitoring device for receiving the copied signaling messages and identifying calls connected without answer supervision based on the signaling messages;
- (c) a billing function operatively associated with the NAS detection function for automatically generating billing information for the calls identified as being connected without answer supervision, wherein automatically generating billing information includes automatically triggering generation of the billing information without requiring injection of an artificial answer message into a signaling message sequence associated with the call; and
- (d) a communication function operatively associated with the billing function for communicating the billing information to a network billing center.

16. The system of claim 15 wherein the signaling messages comprise signaling system 7 (SS7) messages.

17. The system of claim 15 wherein the signaling messages comprise Internet engineering task force (IETF) SIGTRAN protocol messages.

18. The system of claim 15 wherein the monitoring device includes a stand-alone network monitoring platform with external signaling link probes.

19. The system of claim 15 wherein the monitoring device includes message copy functions located within a signaling message routing node.

20. The system of claim 19 wherein the monitoring device is adapted to use the copied signaling messages to produce call detail records (CDRs).

21. The system of claim 20 wherein the NAS detection function is configured to examine the CDRs to identify the calls connected without answer supervision.

22. The system of claim 15 wherein the NAS detection function is configured to identify a call that was completed without answer supervision by determining that an ISDN user part (ISUP) answer (ANM) message associated with the call was not communicated from a terminating switching facility to an originating switching facility and that the call duration exceeds a predetermined threshold.

23. The system of claim 22 wherein the NAS detection function is configured to determine the call duration based on a release message associated with the call.

24. The system of claim 22 wherein the threshold is customizable by a network operator.

25. The system of claim 15 wherein the billing function is adapted to generate automatic message accounting (AMA) information.

26. The system of claim 25 wherein the AMA information includes a billing automatic message accounting (AMA) format (BAF) record.

27. The system of claim 15 wherein the communication function is adapted to forward the billing information via the AMA teleprocessing system (AMATPS) or AMA Data Networking System (AMADNS) protocols.

28. The system of claim 15 wherein the communication function is adapted to forward the billing information to a regional accounting office (RAO).

29. A system for identifying calls connected without answer supervision and for automatically generating billing information for such calls, the system comprising:
- (a) a monitoring device for monitoring and copying signaling messages used to establish a plurality of different calls or transactions;
- (b) a NAS detection function operatively associated with the monitoring device for receiving the copied signaling messages and identifying calls connected without answer supervision based on the signaling messages;
- (c) a billing function operatively associated with the NAS detection function for automatically generating billing information for the calls identified as being connected without answer supervision; and
- (d) a communication function operatively associated with the billing function for communicating the billing information to a network billing center, wherein the billing function is adapted to include an identifier in the message accounting and billing information for identifying a call as being completed without answer supervision.

30. A computer program product for identifying calls connected without answer supervision and for automatically generating billing information for such calls comprising computer-executable instructions embodied in a computer-readable medium for performing steps comprising:
- (a) receiving signaling messages used to set up and tear down a plurality of different calls;
- (b) correlating the signaling messages used to set up and tear down one of the calls into a call detail record;
- (c) analyzing the call detail record to determine whether the call was connected without answer supervision; and
- (d) in response to determining that the call was connected without answer supervision, automatically generating billing information for the call, wherein automatically generating billing information includes automatically triggering generation of the billing information without requiring injection of an artificial answer message into a signaling message sequence associated with the call.

* * * * *